May 10, 1932. W. W. HORN 1,858,085
FOLDING STAND
Filed April 30, 1928 2 Sheets-Sheet 1
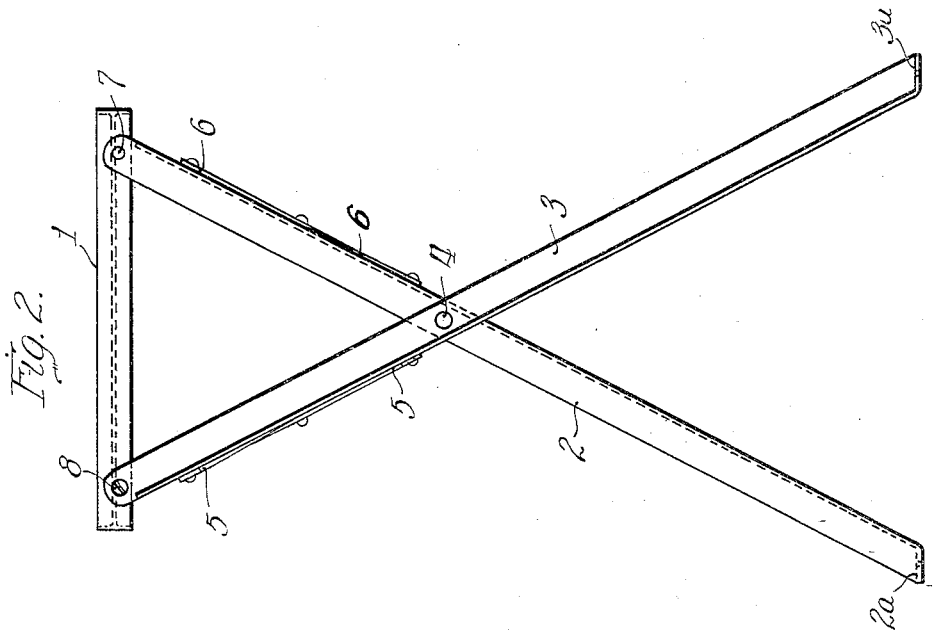
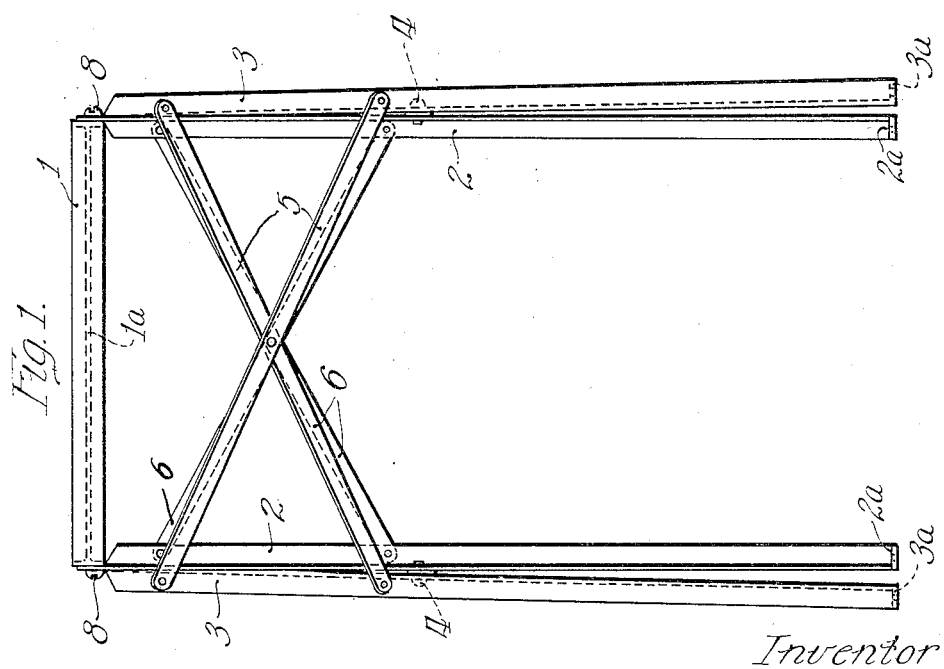
Inventor
William W. Horn
By Brown Jackson Boettcher Dienner
Atty's.

May 10, 1932.  W. W. HORN  1,858,085
FOLDING STAND
Filed April 30, 1928    2 Sheets-Sheet 2
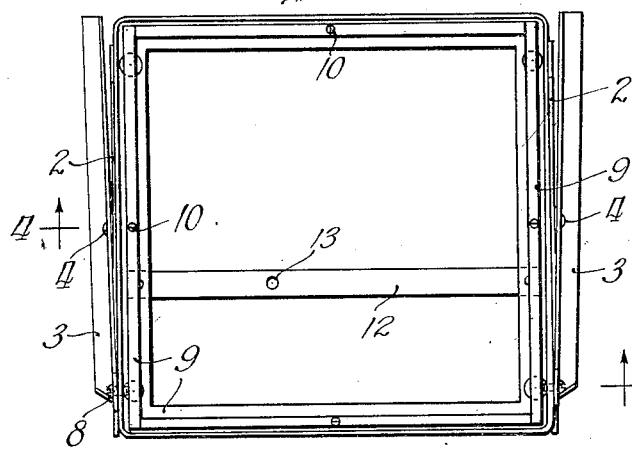
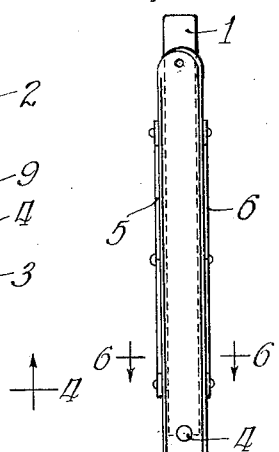
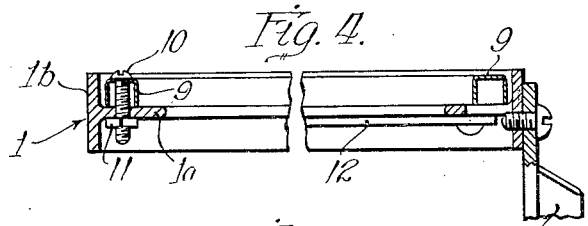
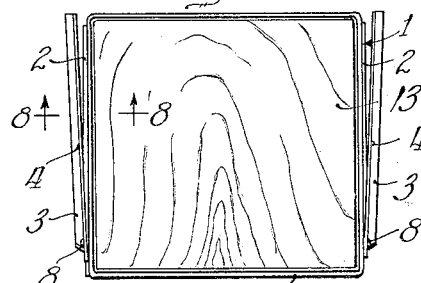
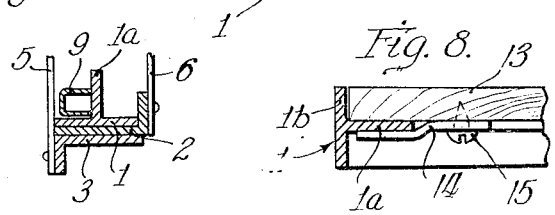
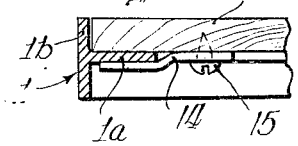
Inventor
William W. Horn
By Bruce Jackson Bottcher Denver
Atty's.

Patented May 10, 1932

1,858,085

UNITED STATES PATENT OFFICE

WILLIAM W. HORN, OF RIVER FOREST, ILLINOIS

FOLDING STAND

Application filed April 30, 1928. Serial No. 273,790.

This invention relates to supporting devices, and more particularly to a folding stand or similar structure.

There is a demand for stands and similar structures for use in offices and other establishments which, when not in use, are capable of being stowed in a small space, such stands being used for supporting typewriting machines, calculating machines, and other machines of appreciable weight relative to their size. It has been difficult to devise suitable folding stands capable of satisfactorily supporting typewriting machines, for instance, due to the weight of such a machine and the conditions of use thereof.

The primary object of my invention is to provide a folding stand, which, when in use, is capable of supporting typewriting machines and various other objects in a satisfactory manner. This stand is also well adapted for supporting dispensing machines, such as coin-operated machines, which machines are frequently quite heavy relative to their size.

A further object of my invention is to provide a stand of this character which may be produced at small cost and which is capable of supporting a heavy load.

Another object of my invention is to provide a stand which can be readily adapted to receive any one of several sizes of base plates or members associated with the machine to be supported by the stand.

A still further object is to provide a stand of this character which can be readily folded, so as to occupy but little space, this stand having associated therewith brace members which coact with the supporting members or legs of the stand to confine the top frame when the stand is folded.

Further objects and advantages of my invention will appear from the detailed description.

In the drawings:

Fig. 1 is a front view of a stand constructed in accordance with my invention;

Fig. 2 is a side view of the stand;

Fig. 3 is a top plan view;

Fig. 4 is a fragmentary section taken substantially on the line 4—4 of Fig. 3;

Fig. 5 is a side view of the stand folded;

Fig. 6 is a fragmentary section taken substantially on line 6—6 of Fig. 5;

Fig. 7 is a plan view of a table top applied to the stand; and

Fig. 8 is a fragmentary section, taken substantially on line 8—8 of Fig. 7.

The stand comprises a rectangular top frame 1, which is formed of a suitable length of iron of angular cross-section, the iron employed being of T-shape in cross-section, as in Fig. 4. This top frame is mounted upon suitable legs or supports which are disposed in pairs at opposite sides of the frame, each pair comprising an inner support 2 and an outer support 3. These supports are formed of angle iron and are oppositely directed, the inner support 2 opening inwardly toward the frame 1. The supports 2 and 3 are pivotally secured together, intermediate their ends, at 4 and, when the table is set up, are disposed in crossed relation. The outer supports 3 are connected by crossed braces 5, riveted or otherwise suitably secured thereto, these braces being secured together at their intersection. The inner supports 2 are similarly connected by crossed braces 6.

The supports 2 are pivotally secured at their upper ends, at 7, to top frame 1 and the supports 3 are detachably secured at their upper ends to the top frame by means of screws 8 which pass through the supports 3 and thread into the top frame, or in any other suitable manner.

The outer flange of support 3 is set at an angle to provide an element $3^a$, forming a foot which bears upon the supporting surface, the inner flange of support 2 being similarly bent at its lower end to provide a foot element $2^a$. The elements $2^a$ and $3^a$ are preferably provided with suitable openings for reception of securing members for fastening the supports to the floor or supporting surface.

A stand constructed in the manner illustrated and described occupies but little space and, due to the angle construction of the supporting members 2 and 3 and the cross-sectional shape of the frame 1, is capable of sustaining heavy loads. Horizontal flange $1^a$ of the frame projects inwardly thereof and provides a seat for a base plate or member of a vending machine, typewriting machine, or other object which it is desired to support upon the stand. I preferably provide channel strips 9 which are secured to flange 1ᵃ, in inverted position upon the upper face thereof, by means of screws 10 passing through the strip and through the flange, the screw 10 receiving a nut 11 which bears against the under face of flange 1ᵃ. Any other suitable or preferred means can be provided for holding the strips 9 in position. These strips provide fillers and, by employing strips of different widths, top frame 1 can be made to accommodate the base plate or member of the particular machine to be supported by the stand, so long as such base member is of greater extent than the opening defined by flange 1ᵃ.

I also preferably provide a flat bar 12 which is riveted or otherwise suitably secured to the under face of flange 1ᵃ. This bar is provided with an opening 13 for reception of a bolt or other suitable securing element, which may also pass through the base member of the machine or object mounted upon the stand. This provides simple and efficient means whereby the machine upon the stand may be effectively secured thereto in such manner as to prevent its unauthorized removal.

When the stand is not in use, it may be readily folded so as to occupy but small space. For this purpose, the screws 8 are removed, after which the top frame 1 is swung downwardly so as to fit snugly between the supporting members 2. The width or vertical height of the top frame 1 corresponds to the width of the outer flanges of the inner supporting members 2 so that the top frame is disposed within such members, after which the outer supporting members 3 are swung about the pivots 4 into superposed parallel relation to the inner members 2, thus completing the folding of the stand. With the parts in the position referred to and illustrated in Fig. 5, the top frame 1 is confined between the inner flanges of the supporting members 2 and the crossed braces 5 of the outer supporting members 3, and is disposed in parallelism with the supporting members. The supporting members thus cooperate to house and confine the top frame and the stand, as a whole, occupies but very little space and may be readily stacked when folded.

In Figs. 7 and 8, I have illustrated my stand as used for a table. For this purpose, I provide a table top 13, which may be formed of wood or any other suitable material and is of a size to fit within the outer flange 1ᵇ of frame 1 and seat upon the inner flange 1ᵃ thereof. This top 13 is provided with a suitable number of clips 14 pivotally secured to the under face thereof, as by means of screws 15, these clips being adapted and disposed to engage beneath flange 1ᵃ when turned about the screws 15 into operative position. In this manner, the top 13 can be readily secured in position in the frame 1 and, when desired, can be readily removed therefrom. Obviously, a stand constructed in accordance with my invention may be used for many other purposes than those above enumerated, and this stand is particularly adapted for supporting unusually heavy loads, such as could not be satisfactorily supported by stands constructed of wood or of metal other than of angle cross-section and not of excessive thickness.

I claim:

1. In a folding stand, a rectangular top frame, pairs of supporting members pivoted together in crossed relation at opposite sides of the frame, each pair comprising an inner member and an outer member, said inner member being of L cross-section and having an outer flange pivoted to the top frame and an inner flange projecting inwardly toward the top frame, means for releasably securing the outer members to the frame, and crossbraces connecting said outer members, the top frame when released fitting into the inner supporting members and the cross-braces confining said frame in said inner members when the supporting members of each pair are disposed in superposed parallel relation.

2. In a folding stand, a rectangular top frame, pairs of supporting members of L cross-section pivoted together in crossed relation at opposite sides of the frame, the members of each pair being oppositely disposed with the inner member opening upwardly and inwardly toward the frame, the outer flanges of the inner members being pivoted at their upper ends to the frame, means releasably securing the inner flanges of the outer members to the frame, said frame when released swinging downwardly into the inner supporting members, and means carried by the outer supporting members for confining the frame in said inner members when the members of each pair are disposed in superposed parallel relation.

3. In a folding stand, a rectangular top frame formed in cross-section to provide an outer vertical flange and an inwardly projecting horizontal flange, pairs of supporting members of L cross-section pivoted together in crossed relation at opposite sides of the frame, the members of each pair being oppositely disposed with the inner member opening upwardly and inwardly toward the frame, the outer flanges of the inner members being pivoted at their upper ends to the frame, means releasably securing the inner flanges of the outer members to the frame, said frame when released swinging downwardly into the inner supporting members, and means carried by the outer supporting members for confining the frame in said inner members when the members of each pair are disposed in superposed parallel relation.

4. In a stand, a top frame of angle cross-section and having a vertical flange and a horizontal flange of the T-shape directed inwardly of the frame, a top fitting into the frame and seating upon the horizontal flange thereof, and clips mounted on the under face of the top and engaging beneath said horizontal flange.

In witness whereof, I hereunto subscribe my name this 26th day of April, 1928.

WILLIAM W. HORN.